US012795672B2

(12) United States Patent
Kim et al.

(10) Patent No.: US 12,795,672 B2
(45) Date of Patent: Nov. 10, 2026

(54) METHOD AND DEVICE FOR PERFORMING UPLINK TRANSMISSION OR RECEPTION IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 18/681,010

(22) PCT Filed: Aug. 5, 2022

(86) PCT No.: PCT/KR2022/011618

§ 371 (c)(1),
(2) Date: Feb. 2, 2024

(87) PCT Pub. No.: WO2023/014144

PCT Pub. Date: Feb. 9, 2023

(65) Prior Publication Data

US 2024/0276504 A1 Aug. 15, 2024

(30) Foreign Application Priority Data

Aug. 5, 2021 (KR) ........................ 10-2021-0103399

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0051* (2013.01); *H04W 72/231* (2023.01); *H04W 72/04* (2013.01)

(58) Field of Classification Search
CPC ... H04W 72/21; H04W 72/231; H04W 72/04; H04W 72/23; H04L 5/0051;
(Continued)

(56) References Cited

U.S. PATENT DOCUMENTS

2020/0314860 A1* 10/2020 Zhou ..................... H04W 72/23
2022/0116183 A1* 4/2022 Gao ...................... H04L 5/0094
(Continued)

FOREIGN PATENT DOCUMENTS

CN 111345092 A * 6/2020 ............ H04W 72/23
EP 4016910 A1 * 6/2022 ............ H04W 72/23
WO 2021142659 7/2021

OTHER PUBLICATIONS

PCT International Application No. PCT/KR2022/011618, International Search Report dated Nov. 18, 2022, 2 pages.
(Continued)

*Primary Examiner* — Wutchung Chu
(74) *Attorney, Agent, or Firm* — LEE, HONG, DEGERMAN, KANG & WAIMEY

(57) ABSTRACT

A method and a device for performing uplink transmission or reception in a wireless communication system are disclosed. A method for performing uplink transmission by a terminal according to an embodiment of the present disclosure may comprise the steps of: receiving configuration information including information related to multiple PUCCH groups from a base station; and receiving, from the base station, first control information related to update of at least one of multiple SR RSs configured for a first PUCCH resource included in a first PUCCH group and a second PUCCH group among the multiple PUCCH groups, wherein at least one of SR RSs configured for multiple PUCCH resources included in the first PUCCH group or the second PUCCH group is updated on the basis of the first control information and an index value of each of the first PUCCH group and the second PUCCH group.

11 Claims, 9 Drawing Sheets

(51) Int. Cl.
*H04W 72/04* (2023.01)
*H04W 72/231* (2023.01)

(58) Field of Classification Search
CPC ... H04L 5/0096; H04L 5/0085; H04L 5/0023; H04L 5/0053; H04L 1/1671; H04L 1/1896; H04L 1/08; H04L 1/0031; H04L 5/0012; H04L 5/0026; H04L 5/0048; H04L 5/0073
See application file for complete search history.

(56) References Cited

U.S. PATENT DOCUMENTS

| | | | | |
|---|---|---|---|---|
| 2022/0287054 | A1* | 9/2022 | Kim | H04L 5/0064 |
| 2023/0143727 | A1* | 5/2023 | Hakola | H04W 52/365<br>455/522 |
| 2024/0040564 | A1* | 2/2024 | Cirik | H04W 16/28 |
| 2024/0243881 | A1* | 7/2024 | Chung | H04L 5/0053 |
| 2024/0276504 | A1* | 8/2024 | Kim | H04L 5/0023 |
| 2025/0192934 | A1* | 6/2025 | Varatharaajan | H04L 5/0044 |

OTHER PUBLICATIONS

ZTE, "Multi-TRP enhancements for PUCCH and PUSCH," 3GPP TSG RAN WG1 Meeting #105-e, R1-2104586, May 2021, 11 pages.

CATT, "Enhancements on PUCCH and PUSCH," 3GPP TSG RAN WG1 #105-e, R1-2104485, May 2021, 15 pages.

Vivo, "Enhancements on Multi-TRP for PUCCH and PUSCH," 3GPP TSG RAN WG1 #105-e, R1-2104344, May 2021, 19 pages.

* cited by examiner

METHOD AND DEVICE FOR PERFORMING UPLINK TRANSMISSION OR RECEPTION IN WIRELESS COMMUNICATION SYSTEM

CROSS-REFERENCE TO RELATED APPLICATION(S)

This application is the National Stage filing under 35 U.S.C. 371 of International Application No. PCT/KR2022/011618, filed on Aug. 5, 2022, which claims the benefit of earlier filing date and right of priority to Korean Application No. 10-2021-0103399, filed on Aug. 5, 2021, the contents of which are all incorporated by reference herein in their entirety.

TECHNICAL FIELD

The present disclosure relates to a wireless communication system, and more specifically, to a method and device for performing uplink transmission and reception or downlink transmission and reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for performing uplink transmission and reception or downlink transmission and reception in a wireless communication system.

Additionally, an additional technical problem of the present disclosure is to provide a method and device for mapping the corresponding PUCCH resource to a specific PUCCH group when a plurality of spatial relation information is configured for the PUCCH resource.

Additionally, an additional technical problem of the present disclosure is to provide a method and apparatus for updating a PUCCH group including PUCCH resources for which a plurality of spatial relation information is configured.

The technical problems to be achieved by the present disclosure are not limited to the above-described technical objects, and other technical objects which are not described herein will be clearly understood by those skilled in the pertinent art from the following description.

In one embodiment of the present disclosure, a method for a user equipment (UE) to perform uplink transmission in a wireless communication system may include receiving, from a base station, configuration information including information related to a plurality of physical uplink control channel (PUCCH) groups; and receiving, from the base station, first control information related to an update on at least one of a plurality of spatial relation reference signals (SR RSs) configured for a first PUCCH resource included in a first PUCCH group and a second PUCCH group among the plurality of PUCCH groups, and based on an index value of each of the first PUCCH group and the second PUCCH group and the first control information, at least one of SR RS configured for a plurality of PUCCH resources included in the first PUCCH group or the second PUCCH group is updated.

In another embodiment of the present disclosure, a method for a base station to perform uplink reception in a wireless communication system may include transmitting, to a user equipment (UE), configuration information including information related to a plurality of physical uplink control channel (PUCCH) groups; and transmitting, to the UE, first control information related to an update on at least one of a plurality of spatial relation reference signals (SR RSs) configured for a first PUCCH resource included in a first PUCCH group and a second PUCCH group among the plurality of PUCCH groups, and based on an index value of each of the first PUCCH group and the second PUCCH group and the first control information, at least one of SR RS configured for a plurality of PUCCH resources included in the first PUCCH group or the second PUCCH group is updated.

According to an embodiment of the present disclosure, a method and device for performing uplink transmission and reception in a wireless communication system may be provided.

Additionally, in an embodiment of the present disclosure, when a plurality of spatial relation information is configured for a PUCCH resource, a method and device for mapping the corresponding PUCCH resource to a specific PUCCH group may be provided.

Additionally, in an embodiment of the present disclosure, a method and device for updating a PUCCH group including PUCCH resources for which a plurality of spatial relation information is configured may be provided.

Effects achievable by the present disclosure are not limited to the above-described effects, and other effects which are not described herein may be clearly understood by those skilled in the pertinent art from the following description.

DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
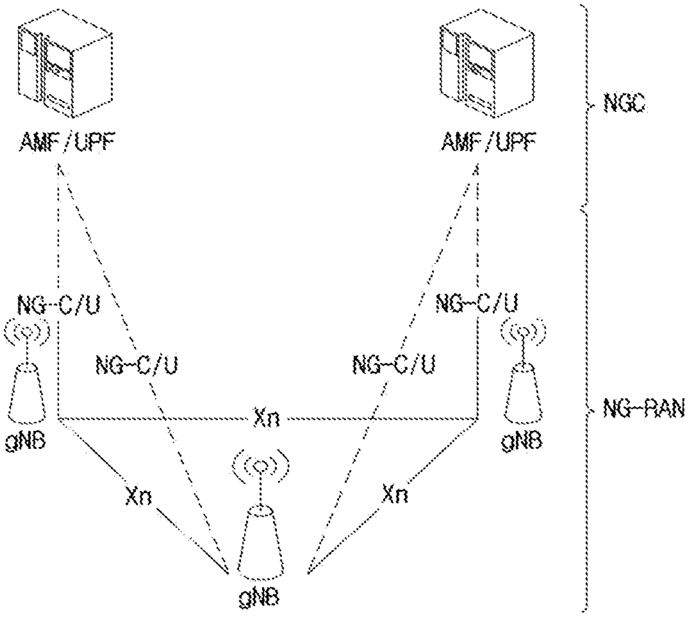
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS S 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
LI-RSRP: Layer 1 reference signal received power
LI-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
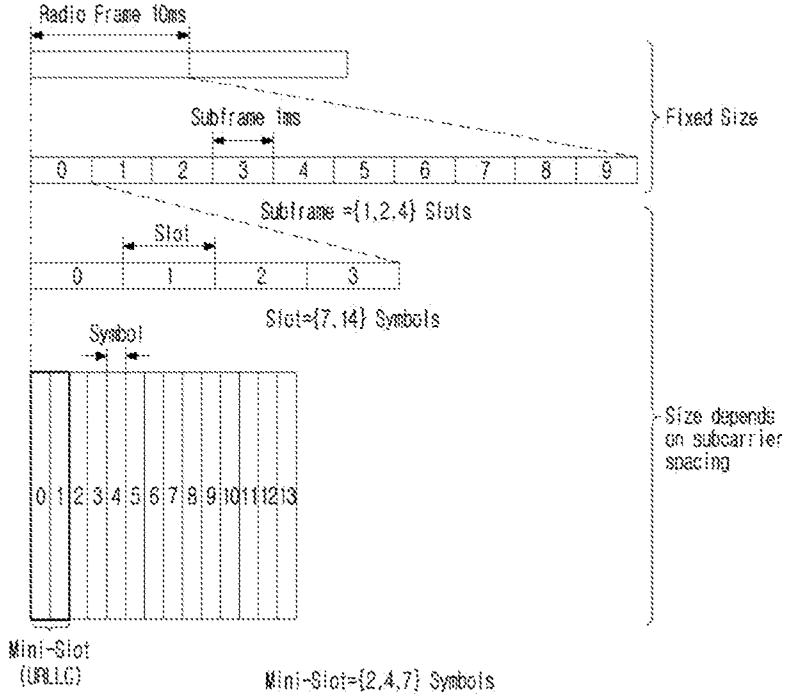
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting p a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $$n_s^{\mu} \in \{0, \ldots, N_{slot}^{subframe,\mu}-1\}$$

in a subframe and are numbered in an increasing order of $$n_{s,f}^{\mu} \in \{0, \ldots, N_{slot}^{frame,\mu}-1\}$$

in a radio frame. One slot is configured with $$N_{symb}^{slot}$$

consecutive OFDM symbols and $$N_{symb}^{slot}$$

is determined according to CP. A start of a slot $$n_s^{\mu}$$

in a subframe is temporally arranged with a start of an OFDM symbol $$n_s^{\mu} N_{symb}^{slot}$$

in the same subframe. All terminals may not perform transmission and reception at the same time, which means that all OFDM symbols of a downlink slot or an uplink slot may not be used. Table 3 represents the number of OFDM symbols per slot $$(N_{symb}^{slot}),$$

the number of slots per radio frame $$(N_{slot}^{frame,\mu})$$

and the number of slots per subframe $$(N_{slot}^{subframe,\mu})$$

in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered.

Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
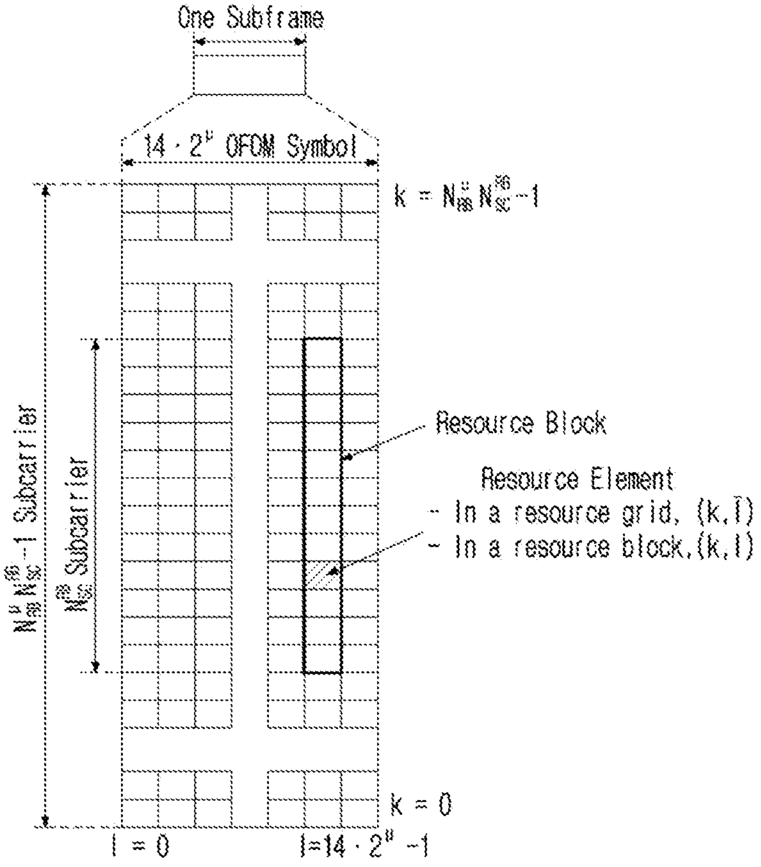
FIG. 3 illustrates a resource grid in a wireless communication system to which the present disclosure may be applied.

FIG. 3 illustrates a resource grid in a wireless communication system to which the present disclosure may be applied. In reference to FIG. 3, it is illustratively described that a resource grid is configured with $$N_{RB}^{\mu} N_{sc}^{RB}$$

subcarriers in a frequency domain and one subframe is configured with $14 \cdot 2^{\mu}$ OFDM symbols, but it is not limited thereto. In an NR system, a transmitted signal is described by OFDM symbols of $$2^{\mu} N_{symb}^{(\mu)}$$

and one or more resource grids configured with $$N_{RB}^{\mu} N_{sc}^{RB}$$

subcarriers. Here, $$N_{RB}^{\mu} \leq N_{RB}^{max,\mu}.$$

The $$N_{RB}^{max,\mu}$$

represents a maximum transmission bandwidth, which may be different between an uplink and a downlink as well as between numerologies.

In this case, one resource grid may be configured per μ and antenna port p. Each element of a resource grid for μ and an antenna port p is referred to as a resource element and is uniquely identified by an index pair (k, l'). Here, $$k = 0, \ldots, N_{RB}^{\mu} N_{sc}^{RB} - 1$$

is an index in a frequency domain and $$l' = 0, \ldots, 2^{\mu} N_{symb}^{(\mu)} - 1$$

refers to a position of a symbol in a subframe. When referring to a resource element in a slot, an index pair (k, l) is used. Here, $$l = 0, \ldots, N_{symb}^{\mu} - 1.$$

A resource element (k, l') for μ and an antenna port p corresponds to a complex value, $$a_{k,l'}^{(p,\mu)}.$$

When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $$N_{sc}^{RB} = 12$$

consecutive subcarriers in a frequency domain. Point A plays a role as a common reference point of a resource block grid and is obtained as follows.

- offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.
- absoluteFrequency PointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k, l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $$N_{BWP,i}^{size,\mu} - 1$$

in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$$N_{BWP,i}^{start,\mu}$$

is a common resource block that a BWP starts relatively to common resource block 0.

Figure 4:
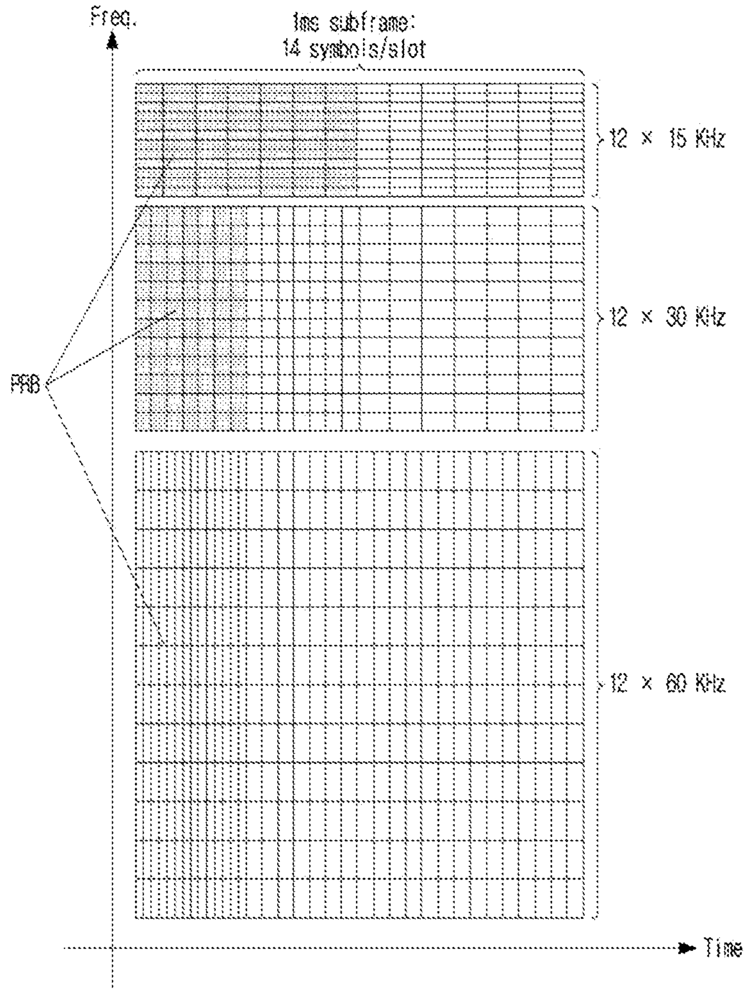
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
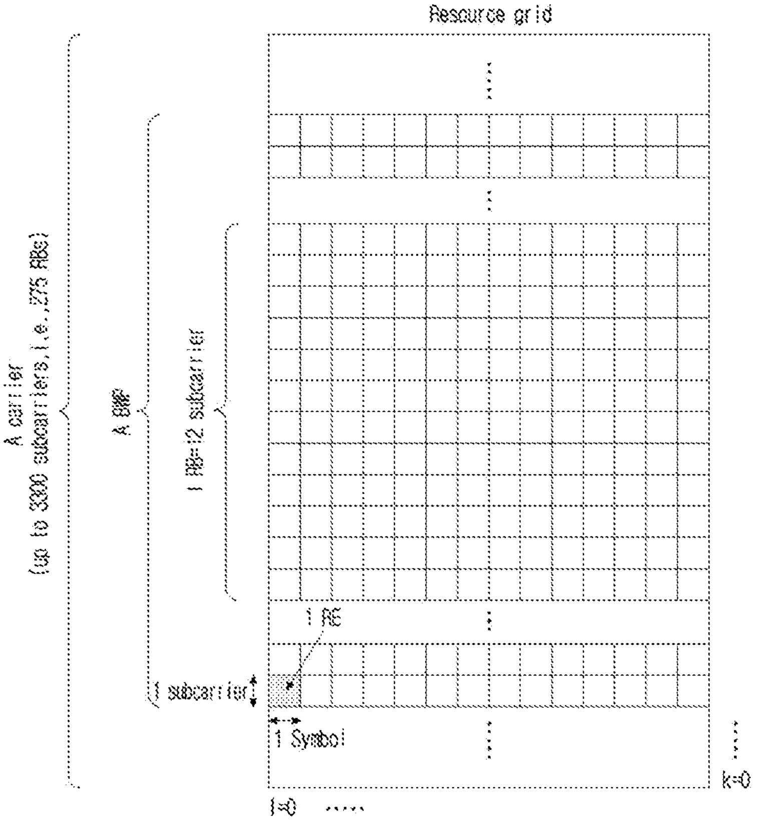
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
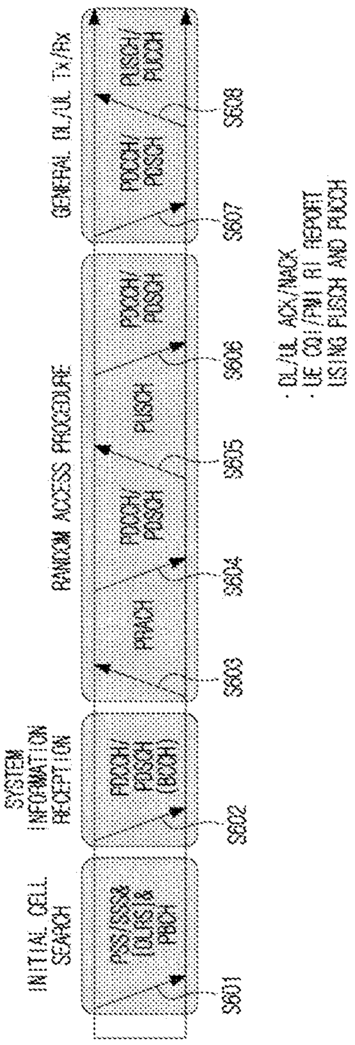
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one |

TABLE 5-continued

| DCI Format | Use |
|---|---|
| | cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
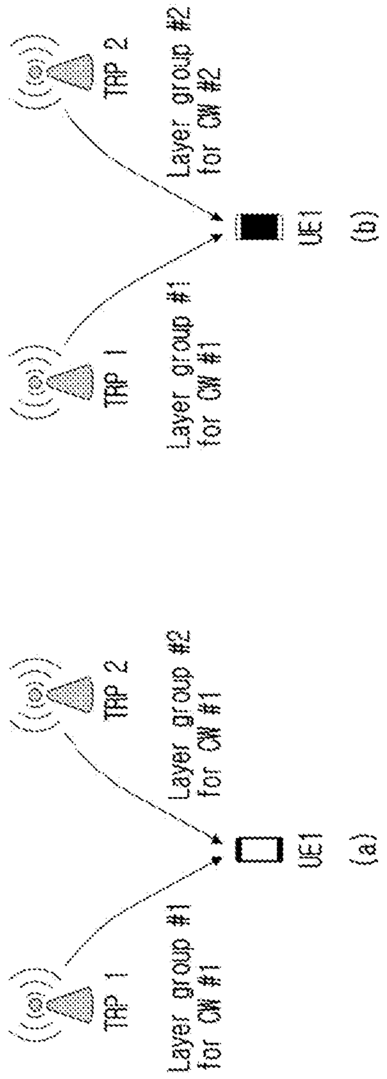
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(*a*), it is shown a case in which layer groups transmitting the same codeword(CW)/transport block(TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and Frequency Resource Allocation is Overlapped and n ($n<=N_S$) TCI States in a Single Slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule 1-b) Method 1b The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1*a* and 1c, the same MCS is applied to all layers or all layer sets.

2) Method 2 (FDM): Frequency Resource Allocation is not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): n (n<=Nt2) TCI States in K (n<=K) Different Slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

Downlink Multiple TRP (M-TRP) URLLC Transmission Operation

The MTRP transmission method, in which M TRPs transmit data to one UE, may be largely divided into two types: the eMBB MTRP transmission method, which is a method to increase the transmission rate, and the URLLC MTRP transmission method, which is a method to increase the reception success rate and reduce latency.

Also from a DCI transport perspective: the MTRP transmission method may be divided into i) an M-DCI (multiple DCI)-based MTRP transmission method in which each TRP transmits a different DCI, and ii) an S-DCI (single DCI)-based MTRP transmission method in which one TRP transmits a DCI. For example, in the case of S-DCI, all scheduling information about data transmitted by MTRP must be transmitted through one DCI, so it may be used in an ideal BH (ideal BackHaul) environment where dynamic cooperation between two TRPs is possible.

The DL M-TRP URLLC transmission method refers to a method in which multiple TPRs transmit the same data/DCI using different space (e.g. layer/port)/time/frequency resources. For example, TRP 1 may transmit specific data/DCI on resource 1, and TRP 2 may transmit the specific data/DCI (i.e., the same data/DCI) on resource 2.

That is, when the DL M-TRP URLLC transmission method is configured, the UE may receive the same data/DCI using different space/time/frequency resources. At this time, the UE may receive indications from the base station regarding the QCL RS/type (i.e., DL TCI status) used in the space/time/frequency resource for receiving the data/DCI.

For example, when the data/DCI is received from resource 1 and resource 2, the UE may receive indications from the base station about the DL TCI state used in resource 1 and the DL TCI state used in resource 2. By receiving the corresponding data/DCI through Resource 1 and Resource 2, high reliability can be achieved. This M-TRP URLLC transmission method may be applied to PDSCH/PDCCH.

The UL M-TRP URLLC transmission method refers to a method in which multiple TRPs receive the same data/UCI from one terminal using different space/time/frequency resources. For example, TRP 1 may receive the same data/UCI from the UE on resource 1, and TRP 2 may receive the same data/UCI from the terminal on resource 2. Additionally, TRP 1 and TRP 2 may share data/UCI received from the terminal through a backhaul link (connected between TRPs).

That is, when the UL M-TRP URLLC transmission method is configured, the UE may transmit the same data/UCI to each TRP using different space/time/frequency resources. At this time, the UE may receive indications from the base station on the Tx beam and Tx power (i.e., UL TCI state) to be used in the space/time/frequency resources transmitting the same data/UCI. For example, when the same data/UCI is transmitted on resource 1 and resource 2, the UE may receive indications from the base station of the UL TCI state used in resource 1 and the UL TCI state used in resource 2. This UL M-TRP URLLC can be applied to PUSCH/PUCCH.

Additionally, in describing the present disclosure, when receiving/transmitting data/DCI/UCI through specific space/time/frequency resources, in the cast of DL, using (or mapping) a specific TCI state (or TCI) may mean estimating a channel from DMRS using QCL type and QCL RS indicated by the specific TCI state in specific space/time/frequency resources, and receiving/demodulating Data/DCI/UCI through the estimated channel.

And, when receiving/transmitting data/DCI/UCI through specific space/time/frequency resources, in the case of UL, using (or mapping) a specific TCI state (or, TCI) may mean transmitting/modulating DMRS and data/UCI using the Tx beam and/or Tx power indicated by the specific TCI state in specific space/time/frequency resources.

And, the UL TCI state may include the UE's Tx beam or Tx power information. Additionally, the base station may configure spatial relation information, etc. for the UE through other parameters instead of the TCI state.

For example, the UL TCI state may be directly indicated to the UE through a UL grant DCI. Alternatively, the UL TCI state may mean spatial relation information of SRS resources indicated through the SRI (SRS resource indicator) field of the UL grant DCI. Alternatively, the UL TCI state may mean an open loop (OP) Tx power control parameter connected to the value indicated through the SRI field of the UL grant DCI.

Here, the OL Tx power control parameters may include, for example, j (index and alpha (Up to 32 parameter value sets per cell) for OP parameter(s) Po, q_d (index of DL RS resource for PL (path loss) measurement (up to 4 measurements per cell), or/and I (Closed loop power control process index (maximum 2 processes per cell)).

In another embodiment of the present disclosure, the M-TRP eMBB transmission method refers to a method in which M-TRP transmits different data/DCI using different space/time/frequency resources. If the M-TRP eMBB transmission method is configured, the UE may receive an indication of a plurality of TCI states from the base station through DCI, and may assume that the data received using the QCL RS indicated by each of the plurality of TCI states is different data.

In addition, as the RNTI for M-TRP URLLC and the RNTI for M-TRP eMBB are used separately, the UE may determine whether a specific transmission/reception is M-TRP URLLC transmission/reception or M-TRP eMBB transmission/reception. For example, if the RNTI for URLLC is used and the CRC is masked for DCI, the UE may recognize the transmission as a URLLC transmission. In addition, when the RNTI for eMBB is used and CRC is masked for DCI, the UE may recognize the transmission as an eMBB transmission. As another example, the base station may configure the M-TRP URLLC transmission/reception method or the M-TRP eMBB transmission/reception method to the UE through new signaling.

For convenience of description of the present disclosure, it is assumed that 2 TRPs cooperate with each other to perform transmission/reception operations, but the present disclosure is not limited thereto. In other words, the present disclosure may be expanded and applied in an environment with multiple TRPs of 3 or more, and may also be expanded and applied in an environment where the same TRP transmits/receives to different panels or beams. The UE may recognize different TRPs as different TCI states. When the UE transmits and receives data/DCI/UCI using TCI state 1, it means transmitting and receiving data/DCI/UCI/from TRP 1 (or to TRP 1).

The present disclosure may be used in a situation where the MT-RP cooperatively transmits the PDCCH (repeatedly transmits the same PDCCH or transmits it separately). Additionally, the present disclosure may be used in situations where M-TRP cooperatively transmits PDSCH or cooperatively receives PUSCH/PUCCH.

Additionally, in describing the present disclosure, the meaning that multiple base stations (i.e., M-TRP) repeatedly transmit the same PDCCH may mean that the same DCI is transmitted through multiple PDCCH candidates, and is the same as the meaning that multiple base stations repeatedly transmit the same DCI. Here, two DCIs with the same DCI format/size/payload may be viewed as the same DCI.

Alternatively, if the scheduling results are the same even though the payloads of the two DCIs are different, the two DCIs may be viewed as the same DCI. For example, the time domain resource allocation (TDRA) field of DCI may relatively determine the slot/symbol position of data and the slot/symbol position of A(ACK)/N(NACK) based on the reception time of DCI.

At this time, if the DCI received at time n and the DCI received at time n+1 indicate the same scheduling result to the UE, the TDRA fields of the two DCIs are different, and as a result, the DCI payloads are different. Therefore, if the scheduling results are the same even though the payloads of the two DCIs are different, the two DCIs may be viewed as the same DCI. Here, the number of repetitions R may be directly indicated by the base station to the terminal or mutually agreed upon.

Alternatively, even if the payloads of the two DCIs are different and the scheduling results are not the same, if the scheduling result of one DCI is a subset of the scheduling result of the other DCI, the two DCIs may be viewed as the same DCI.

For example, if the same data is TDMed and transmitted repeatedly N times, DCI 1 received before the first data indicates (or scheduling) data repetition N times, and DCI 2 received before the second data indicates N−1 data repetition (scheduling). At this time, the scheduling result (or data) of DCI 2 is a subset of the scheduling result (or data) of DCI 1, and both DCIs have scheduling results for the same data. Therefore, even in this case, the two DCIs may be considered the same DCI.

And, in explaining the present disclosure, Multiple base stations (i.e., M-TRP) transmitting the same PDCCH separately means that one DCI is transmitted through one PDCCH candidate, TRP 1 transmits some resources defined for the PDCCH candidate, and TRP 2 This may mean transmitting the remaining resources.

For example, when TRP 1 and TRP 2 separately transmit PDCCH candidates corresponding to aggregation level m1+m2, the PDCCH candidate is divided into PDCCH candidate 1 corresponding to aggregation level ml and PDCCH candidate 2 corresponding to aggregation level m2, TRP 1 may transmit PDCCH candidate 1, and TPR 2 may transmit PDCCH candidate 2. At this time, TRP 1 and TRP 2 may transmit PDCCH candidate 1 and PDCCH candidate 2 using different time/frequency resources. After receiving PDCCH candidate 1 and PDCCH candidate 2, the UE may generate a PDCCH candidate corresponding to aggregation level m1+m2 and attempt DCI decoding.

At this time, the method in which the same DCI is transmitted by dividing it into several PDCCH candidates may be implemented in the following two ways.

In the first method, the DCI payload (e.g., control information+CRC) is encoded through one channel encoder (e.g., polar encoder) and transmitted divided into two TRPs. That is, the first method refers to a method in which coded bits obtained according to the encoding result are divided into two TRPs and transmitted. Here, the entire DCI payload may be encoded in the coded bits transmitted by each TRP, but this is not limited to this, and only a portion of the DCI payload may be encoded.

The second method is to divide the DCI payload (e.g., control information+CRC) into two DCIs (e.g., DCI 1 and DCI 2) and then encode each through a channel encoder (e.g., polar encoder). Thereafter, each of the two TRPs may transmit a coded bit corresponding to DCI 1 and a coded bit corresponding to DCI 2 to the UE.

That is, multiple base stations (MTRPs) dividing/repeating the same PDCCH to transmit across multiple MOs may mean that 1) the coded DCI bits encoding the entire DCI content of the corresponding PDCCH are repeatedly transmitted through each MO for each base station (STRP), 2) the coded DCI bits encoding the entire DCI content of the corresponding PDCCH are divided into a plurality of parts, and different parts are transmitted for each base station (STRP) through each MO, or 3) the DCI content of the corresponding PDCCH is divided into a plurality of parts, different parts are separately encoded for each base station (STRP), and transmitted through each MO.

Repeated/divided transmission of the PDCCH may be understood as transmitting the PDCCH multiple times over several TO (transmission occasions).

Here, TO means a specific time/frequency resource unit in which the PDCCH is transmitted. For example, if the PDCCH is transmitted multiple times (to a specific RB) over slots 1, 2, 3, and 4, TO may mean each slot, if the PDCCH is transmitted multiple times (in a specific slot) over RB sets 1, 2, 3, and 4, TO may mean each RB set, or if the PDCCH is transmitted multiple times over different times and frequencies, TO may mean each time/frequency resource. In addition, a TCI state used for DMRS channel estimation may be set differently for each TO, and it may be assumed that a TO with a different TCI state is transmitted by different TRP/panel.

A plurality of base stations repeatedly transmitting or dividing the PDCCH to transmit may mean that a PDCCH is transmitted across multiple TOs, and the union of the TCI states established in those TOs consists of two or more TCI states. For example, when the PDCCH is transmitted over TO 1, 2, 3, 4, TCI states 1, 2, 3, 4 may be configured in each of TO 1, 2, 3, 4, which means that TRP i cooperatively transmits PDCCH in TO i.

In describing the present disclosure below, the UE repeatedly transmitting the same PUSCH so that multiple base stations (i.e., MTRPs) receive it may mean that the same data is transmitted through a plurality of PUSCHs, and each PUSCH may be optimized and transmitted for uplink channels of different TRPs.

For example, the UE may repeatedly transmit the same data through PUSCH 1 and 2, and the UE may transmit PUSCH 1 using UL TCI state 1 for TRP 1, and the UE may receive and transmit a value optimized for a channel of TRP 1 for link adaptation such as precoder/MCS as well. The UE may transmit PUSCH 2 by using UL TCI state 2 for TRP 2, and the UE may transmit by scheduling a value optimized for the channel of TRP 2 for link adaptation such as precoder/MCS. In this case, repeatedly transmitted PUSCHs 1 and 2 may be transmitted at different times to be TDM, FDM, or SDM.

In addition, in describing the present disclosure below, the UE dividing and transmitting the same PUSCH so that multiple base stations (i.e., MTRP) may receive it may mean that one data is transmitted through one PUSCH, but the resources allocated to the PUSCH are split and optimized for UL channels of different TRPs for transmission.

For example, the UE may transmit the same data through 10 symbol PUSCH. At this time, the first 5 symbols of the 10 symbols may be transmitted using UL TCI state 1 for TRP 1, and the UE may adapt links such as precoder/MCS and receive scheduling with values optimized for the channel of TRP 1 and transmit 5 symbol PUSCH (with TRP 1). The remaining 5 symbols may be transmitted using UL TCI state 2 for TRP 2, and the UE may adapt links such as precoder/MCS and receive scheduling values optimized for the channel of TRP 2 and transmit the remaining 5 symbol PUSCH (with TRP 2).

In the above example, a method of dividing one PUSCH into time resources and performing TDM for transmission toward TRP 1 and transmission toward TRP 2 has been described, but the present disclosure is not limited to this. The UE may divide and transmit the same PUSCH to multiple base stations by using the FDM/SDM method.

The UE may repeatedly transmit PUCCH to multiple base stations (similar to PUSCH transmission) or transmit the same PUCCH separately.

In addition, when multiple TOs are indicated to the UE for repeated or divided transmission of PDCCH/PDSCH/PUSCH/PUCCH, each TO may transmit UL toward a specific TRP or receive DL from a specific TRP. Here, UL TO transmitted toward TRP 1 (or, TO of TRP 1) may mean TO using the first value of two spatial relation (RS) indicated to the UE, two UL TCIs, two UL power control parameters, or two PL(pathloss)-RSs. In addition, UL TO transmitted toward TRP 2 (or, TO of TRP 2) means TO using the second value of two spatial relationships indicated to the UE, two UL TCIs, two UL power control parameters, and two PL-RSs.

Similarly, during DL transmission, DL TO transmitted by TRP 1 (or TO of TRP 1) means TO using the first value of the two DL TCI states indicated to the UE (for example, when two TCI states are configured in CORESET). And, DL TO transmitted by TRP 2 (or, TO of TRP 2) may mean TO using the second value of the two DL TCI states indicated to the UE (for example, when two TCI states are set in CORESET).

The present disclosure may be expanded and applied to various channels such as PUSCH/PUCCH/PDSCH/PDCCH. Additionally, the present disclosure may be extended and applied to both the case of repeatedly transmitting the channel to different space/time/frequency resources and the case of divided transmission.

Hereinafter, when two spatial relation information is configured in a PUCCH resource, a method of mapping the corresponding PUCCH resource to a specific PUCCH and a method of updating the spatial relation information configured for the PUCCH resource included in the PUCCH group will be described.

Method for Updating Spatial Relation Information Configured for PUCCH Resources

For MTRP PUCCH repeated transmission, two spatial relation information may be configured for PUCCH resources. When PC (power control) parameters such as PL (pathloss)-RS, Alpha, PO, and closed loop index are configured as each spatial relation information, a spatial relation RS may be configured for the UE.

That is, PC information and spatial relation RS information corresponding to each of the two TRPs may be configured through two spatial relation information. In addition, the UE may transmit PUCCH using the first spatial relation information (e.g., first spatial relation RS) in TO 1, and may transmit the same UCI (i.e., CSI, ACK/NACK information, or SR, etc.) through PUCCH using the second spatial relation information (e.g., second spatial relation RS) in TO 2.

That is, the UE may transmit PUCCH in TO 1 using beam information corresponding to the first spatial relation RS, and transmit PUCCH in TO 2 using beam information corresponding to the second spatial relation RS.

For convenience of explanation of the present disclosure, a PUCCH resource configured with two spatial relation information may be named an MTRP PUCCH resource, and a PUCCH resource configured with one spatial relation information may be named an STRP PUCCH resource.

In a basic wireless communication system, a PUCCH group consisting of (or bundled with) one or more PUCCH resources may be established for the UE. The maximum number of PUCCH groups that may be configured for a UE may be 4. However, this is only an example, and four or more PUCCH groups may be configured for the UE.

When the spatial relation RS of one PUCCH resource included in a PUCCH group is updated to a specific RS, all spatial relation RSs established for the remaining PUCCH resources belonging to the same group may be updated to the specific RS. That is, the base station may update spatial relation information configured for multiple PUCCH resources at once through MAC CE, and thus overhead may be reduced.

When one or more PUCCH resources used by each TRP are grouped into one PUCCH group, information configured for the PUCCH resources included in the PUCCH group can be updated at once through a MAC CE message. For example, the PUCCH resources used by TRP 1 may be configured to PUCCH group 1, and the PUCCH resources used by TRP 2 may be configured to PUCCH group 2.

When the PUCCH beam of TRP 1 (i.e., the spatial relation RS established for PUCCH resources) is unstable, it is desired to update to another beam, all PUCCH beams of TRP 1 may be changed by updating one of the random resources of PUCCH group 1.

The above-described operation may be equally applied to PL RS as well as spatial relation RS. That is, when the PL RS corresponding to one PUCCH resource in the PUCCH group is updated to a specific RS, all PL RSs corresponding to the remaining PUCCH resources belonging to the same PUCCH group may be updated to the specific PL RS.

Since there are multiple spatial relation information configured for the MTRP PUCCH resource (e.g., two), the corresponding MTRP PUCCH resource may belong to multiple PUCCH groups (e.g., two PUCCH groups).

As an example, assume that MTRP PUCCH resources belong to two PUCCH groups. When the spatial relation RS of an MTPR PUCCH resource is updated, which of the two PUCCH groups to which the corresponding MTRP PUCCH resource belongs must be determined which PUCCH group to update the spatial relation RS.

Hereinafter, when a specific spatial relation RS of an MTRP PUCCH resource is updated, a method of determining a PUCCH group to be updated among a plurality of PUCCH groups to which the MTRP PUCCH resource belongs will be described.

Figure 8:
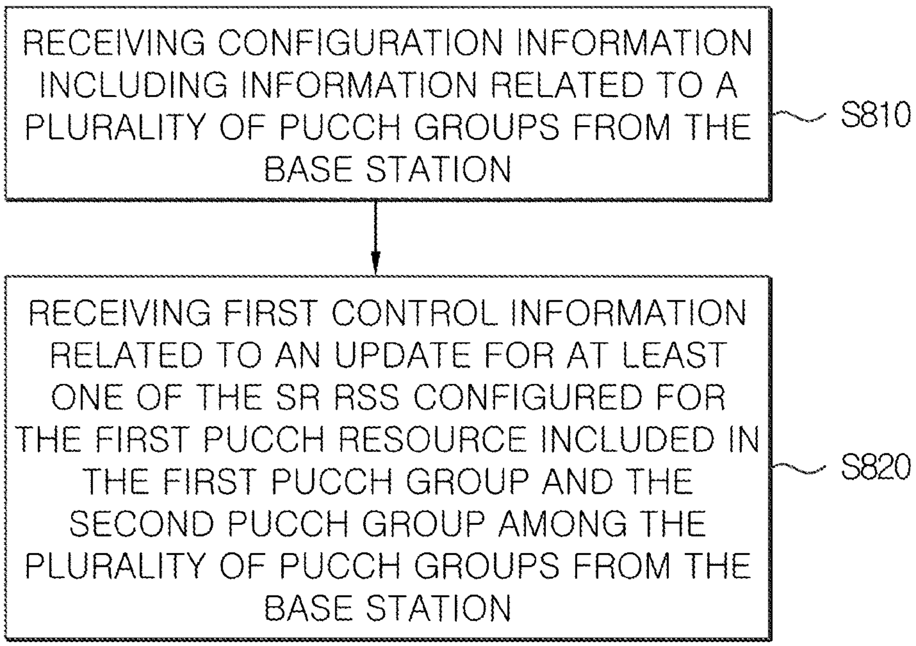
FIG. 8 is a diagram for describing an uplink transmission operation of a UE in a wireless communication system to which the present disclosure may be applied.

FIG. 8 is a diagram for describing an uplink transmission operation of a terminal in a wireless communication system to which the present disclosure may be applied.

The UE may receive configuration information including information related to a plurality of physical uplink control information (PUCCH) groups from the base station (S810).

For example, the configuration information may include one or more spatial relation (SR) information (e.g., SR RS/PL RS, etc.) configured for number of PUCCH groups consisting of one or more PUCCH resources, information on PUCCH resources included in a specific PUCCH group, or/and PUCCH resource/group. As an example, the configuration information may include UE-specific PUCCH configuration information (e.g., ‘PUCCH-config’), but is not limited thereto.

The UE may receive first control information related to an update for at least one of the SR RSs configured for the first PUCCH resource included in the first PUCCH group and the second PUCCH group among the plurality of PUCCH groups from the base station (S820).

The UE may receive first control information for updating at least one of a plurality of SR RSs configured for the first PUCCH resource from the UE. That is, the first control information may include update information of all of a plurality of SR RSs or a specific SR RS. At this time, the first PUCCH resource (i.e., MTRP PUCCH resource) may be included in both the first PUCCH group and the second PUCCH group.

Here, the first control information may include at least one of identification information of the first PUCCH resource (i.e., PUCCH resources to be updated), identification information of the SR RS to be updated among a plurality of SR RSs or identification information of at least one SR RS to be newly established for the first PUCCH resource (i.e., SR RS ID to be newly activated for the first PUCCH resource).

Additionally, the first control information may be transmitted from the base station to the UE through MAC CE, but is not limited thereto. The first control information may also be transmitted through DCI or/and RRC messages.

In addition, the UE may update at least one of the SR RSs configured for a plurality of PUCCH resources included in the first PUCCH group and/or the second PUCCH group, based on the index value and first control information of each of the first PUCCH group and the second PUCCH group, For example, based on the update of the first SR RS among a plurality of SR RSS configured for the first PUCCH resource being indicated by the first control information, at least one SR RS configured for a plurality of PUCCH resources included in the first PUCCH group may be updated. At this time, the index value of the first PUCCH group may be smaller than the index value of the second PUCCH group.

That is, based on the update of the first SR RS among the plurality of SR RSs configured for the first PUCCH resource being indicated, the SR RS configured for the PUCCH resource included in the PUCCH group with a small index value among the PUCCH groups to which the first PUCCH resource belongs may be updated.

At this time, assume that a plurality of SR RSs are configured for the second PUCCH resource among the plurality of PUCCH resources included in the first PUCCH group. The first SR RS among the plurality of SR RSs configured for the second PUCCH resource and the first SR RS among the plurality of SR RSs configured for the first PUCCH resource may be (simultaneously) updated to the same RS. That is, the first SR RS among the plurality of SR RSs configured for the MTRP PUCCH included in the first PUCCH group may be updated to be the same as the first SR RS among the plurality of SR RSs configured for the first PUCCH resource.

As another example, based on the update of the second SR RS among the plurality of SR RSs configured for the first PUCCH resource being indicated by the first control information, at least one SR RS configured for a plurality of PUCCH resources included in the second PUCCH group (that is, a PUCCH group with an index value higher than the index value of the first PUCCH group) may be updated.

That is, based on the update of the second SR RS among the plurality of SR RSs configured for the first PUCCH resource being indicated, the SR RS configured for the PUCCH resource included in the PUCCH group with a high index value among the PUCCH groups to which the first PUCCH resource belongs may be updated.

At this time, assume that multiple SR RSs are configured for the third PUCCH resource among the multiple PUCCH resources included in the second PUCCH group. The second SR RS among the plurality of SR RSs configured for the third PUCCH resource and the second SR RS among the plurality of SR RSs configured for the first PUCCH resource may be (simultaneously) updated to the same RS. That is, the second SR RS among the plurality of SR RSs configured for the MTRP PUCCH included in the second PUCCH group may be updated to be the same as the second SR RS among the plurality of SR RSS configured for the first PUCCH resource.

As another example, the UE may receive second control information from the base station indicating the update of a single SR RS configured for the fourth PUCCH resource among the plurality of PUCCH resources included in the first PUCCH group. At this time, the first SR RS among a plurality of SR RSs configured for the first PUCCH resource (or a separate MTRP PUCCH resource included in the first PUCCH group) may be updated.

That is, when second control information suggesting an update of the SR RS configured for the STRP PUCCH included in the first PUCCH group is received from the base station, the UE may compare the index values of the first PUCCH group and the second PUCCH group. If the index value of the first PUCCH group is lower than the index value of the second PUCCH group, the first SR RS among a plurality of SR RSs configured for the MTRP PUCCH included in the first PUCCH group may be updated. At this time, the first SR RS among the plurality of SR RSs configured for MTRP PUCCH and the SR RS configured for STRP PUCCH may be (simultaneously) updated to the same RS.

As another example, the UE may receive fourth control information from the base station indicating the update of a single SR RS configured for the fifth PUCCH resource among the plurality of PUCCH resources included in the second PUCCH group. At this time, the second SR RS among a plurality of SR RSs configured for the first PUCCH resource (or a separate MTRP PUCCH resource included in the third PUCCH group) may be updated.

That is, based on third control information suggesting an update of the SR RS set for the STRP PUCCH included in the second PUCCH group being received from the base station, the UE may compare the index values of the first PUCCH group and the second PUCCH group. If the index value of the first PUCCH group is lower than the index value of the second PUCCH group, the second SR RS among a plurality of SR RSs configured for the MTRP PUCCH included in the second PUCCH group may be updated. At this time, among the plurality of SR RSs configured for MTRP PUCCH, the second SR RS and the SR RS configured for STRP PUCCH may be (simultaneously) updated to the same RS.

As another example, the first PUCCH group may include a fourth PUCCH resource configured with a single SR RS, and the second PUCCH group may include a fifth PUCCH resource configured with a single SR RS. Assume that an update of a plurality of SR RSs configured for the first PUCCH resource is indicated by the base station by first control information.

At this time, the single SR RS configured for the fourth PUCCH resource and the first SR RS among the plurality of SR RSs are updated to the same RS, and the single SR RS configured for the fifth PUCCH resource and a second SR RS among the plurality of SR RSs may be updated (simultaneously) to the same RS.

As another example, assume that at least one of the first PUCCH group or the second PUCCH group includes a PUCCH resource (i.e., STRP PUCCH resource) for which a single SR RS is configured. Here, based on the update of a plurality of SR RSs set for the first PUCCH resource being indicated by the first control information, the UE may receive information about the SR RS to be applied to update a single SR RS among the plurality of SR RSs from the base station.

That is, the UE may receive information related to the SR RS to be applied to the update of the SR RS configured for the STRP PUCCH among the plurality of SR RSS configured for the MTRP PUCCH resource from the base station. For example, the UE may receive indication information from the base station that the first SR RS among a plurality of SR RSs configured for the first PUCCH resource will be applied to the update of a single SR RS. At this time, the first SR RS and the single SR RS among the plurality of SR RSs may be (simultaneously) updated to the same RS based on the indication information.

Figure 9:
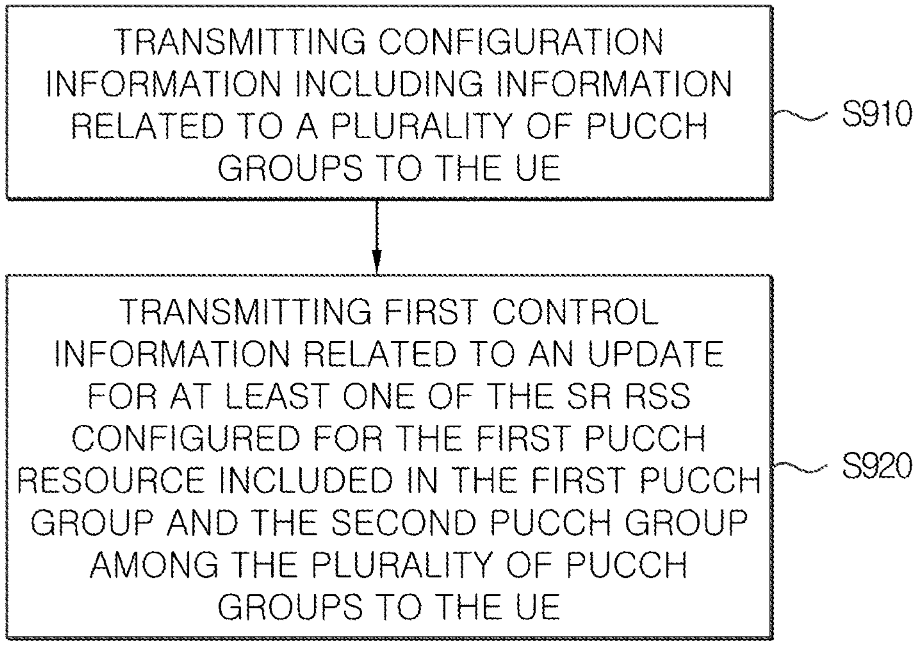
FIG. 9 is a diagram for describing an uplink reception operation of a base station in a wireless communication system to which the present disclosure may be applied.

FIG. 9 is a diagram for describing an uplink reception operation of a base station in a wireless communication system to which the present disclosure may be applied.

The base station may transmit configuration information including information related to a plurality of physical PUCCH groups to the UE (S910).

The base station may transmit first control information related to an update for at least one of a plurality of SR RSs configured for the first PUCCH resource included in the first PUCCH group and the second PUCCH group among the plurality of PUCCH groups to the terminal (S920).

Here, the operations and related information (e.g., setting information, instruction information) according to steps S910 and S920 may correspond to the operations and related information according to steps S810 and S820, so redundant description will be omitted.

A method of updating SR information for the PUCCH group to which an MTRP PUCCH resource belongs and a method of matching an MTRP PUCCH resource to a specific PUCCH group are specifically described.

EMBODIMENT 1

In Implementation 1, it is assumed that two spatial relation RSs are configured for the MTRP PUCCH resource, and accordingly, the MTRP PUCCH resource belongs to two PUCCH groups. However, this is only an example, and two or more spatial relation RSs may be established for the MTRP PUCCH resource, and accordingly, the corresponding MTRP PUCCH resource may belong to two or more PUCCH groups.

As an example, assume that the first spatial relation RS among the two spatial relation RSs configured for the MTRP PUCCH resource (or a specific spatial relation RS with a low index among the two spatial relation RSs) is updated to a specific RS.

At this time, the spatial relation RS of the PUCCH resource included in the PUCCH group with the lower index among the two PUCCH groups to which the corresponding MTRP PUCCH resource belongs may be updated. And, among the two spatial relation RSs configured for (other) MTRP PUCCH resources included in the corresponding PUCCH group, only the first spatial relation RS (or the spatial relation RS with a low index) may be updated to a specific RS.

As an another example, assume that the second spatial relation RS among the two spatial relation RSs configured for the MTRP PUCCH resource (or a specific spatial relation RS with a high index among the two spatial relation RSs) is updated to a specific RS.

At this time, the spatial relation RS of the PUCCH resource included in the PUCCH group with the higher index among the two PUCCH groups to which the corresponding MTRP PUCCH resource belongs may be updated. And, among the two spatial relation RSs set for (other) MTRP PUCCH resources included in the corresponding PUCCH group, only the second spatial relation RS (or the spatial relation RS with a high index) may be updated to a specific RS.

As an example, it is assumed that PUCCH group 0 is configured to include PUCCH resources 0, 1, and 2, SR (spatial relation)-RS 0 and 1 are configured for PUCCH resource 0, and SR-RS 2 and 3 are configured for PUCCH resource 1, and SR-RS 4 is configured for PUCCH resource 2.

In addition, it is assumed that PUCCH group 0 is configured to include PUCCH resources 0, 1, and 3, SR-RS 0 and 1 are configured for PUCCH resource 0, SR-RS 2 and 3 are configured for PUCCH resource 1, and SR-RS 5 is configured for PUCCH resource 3.

That is, PUCCH resources 0 and 1 are MTRP PUCCH resources and can simultaneously belong to PUCCH groups 0 and 1, and PUCCH resources 2 and 3 are STRP PUCCH resources and can belong to PUCCH groups 0 and 1, respectively.

As Embodiment 1-1, when SR-RS 0, the first spatial relation RS of PUCCH resource 0, is updated to a specific RS, at least one SR-RS configured for the PUCCH resource of PUCCH group 0 may be updated to a specific RS. For example, SR-RS 2, which is the first spatial relation RS of PUCCH Resource 1, and SR-RS 4, which is the spatial relation RS of PUCCH Resource 2, may be updated to a specific RS.

As Embodiment 1-2, when SR-RS 1, the second spatial relation RS of PUCCH resource 0, is updated to a specific RS, at least one SR-RS configured for the PUCCH resource of PUCCH group 1 may be updated to a specific RS. For example, SR-RS 3, which is the second spatial relation RS of PUCCH resource 1, and SR-RS 5, which is the spatial relation RS of PUCCH resource 3, may be updated to a specific RS.

As another example, when both spatial relation RSs of PUCCH resource 0 are updated, both Embodiment 1-1 and Embodiment 1-2 are applied. For example, when both the first spatial relation RS and the second spatial relation RS of PUCCH resource 0 are updated, all spatial relation RSs belonging to the two PUCCH groups including PUCCH resource 0 may be updated.

When two spatial relation RSs of MTRP PUCCH resources are updated, the update method of the spatial relation of STRP PUCCH resources will be described with reference to Embodiment 2-2.

EMBODIMENT 2

When one PUCCH group includes both STRP PUCCH resources and MTRP PUCCH resources, depending on which PUCCH resource (i.e., STRP PUCCH resource or MTRP PUCCH resource) the spatial relation RS is updated, the update method of the spatial relation RS of the PUCCH resource included in the same PUCCH group may vary.

In Embodiment 2, when the spatial relation RS of STRP PUCCH resources is updated, the spatial relation RS of MTRP PUCCH resources belonging to the same PUCCH group is updated (Embodiment 2-1) and when both spatial relation RSs of MTRP PUCCH resources are updated, update method of STRP PUCCH resources belonging to the same PUCCH group (Embodiment 2-2) may be described

EMBODIMENT 2-1

When one PUCCH group includes both STRP PUCCH resources and MTRP PUCCH resources, it is assumed that the spatial relation RS of the STRP PUCCH resource is updated to a specific RS.

At this time, both spatial relation RSs of the MTRP PUCCH resource may be equally updated to a specific RS (that is, updated to the updated RS for the STRP PUCCH resource). For example, when PUCCH resource 2 in Embodiment 1 is updated to a specific RS, both PUCCH resources 0 and 1 of PUCCH group 0 can be updated to the specific RS.

That is, as the spatial relation RS of a specific TRP corresponding to the STRP PUCCH resource is updated, both spatial relation RSs of the MTRP PUCCH resource may be updated into one RS. Accordingly, MTRP PUCCH resources may no longer be used for MTRP transmission, but may be used for STRP transmission.

Even when the spatial relation RS of the STRP PUCCH resource is updated to a specific RS, in order to use the MTRP PUCCH resource of the same group for MTRP transmission purposes, only one of the two spatial relation RSs of the MTRP PUCCH resource may be configured/defined to be updated.

To this end, the base station may provide information on the spatial relation RS to be updated among the two spatial relation RSs of the MTRP PUCCH resource to the UE through signaling such as an RRC message/MAC CE. At this time, signaling including information on the spatial relation RS to be updated may be configured/defined for each PUCCH group.

Additionally or alternatively, it may be defined/configured to update only the first (or second) spatial relation RS of the two spatial relation RSs established for the MTRP PUCCH resource.

Additionally or alternatively, according to the index of the PUCCH group to be currently updated (i.e., the PUCCH group to which the STRP belongs whose spatial relation RS is updated) among the two PUCCH groups to which the MTRP PUCCH resource belongs, the spatial relation RS to be updated among the two spatial relation RSs set for the MTRP PUCCH resource may be determined.

Specifically, if the index value of the PUCCH group to be updated is high (i.e., if the PUCCH group to be updated is a high index group), the UE may update the first spatial relation RS among the two spatial relation RSs configured for the MTRP PUCCH resource. And, if the index value of the PUCCH group to be updated is low (i.e., if the PUCCH group to be updated is a low index group), the UE may update the second spatial relation RS among the two spatial relation RSs configured for the MTRP PUCCH resource.

For example, assume that the spatial relation RS established for PUCCH resource 2 in Example 1 is updated. At this time, among the two PUCCH groups to which PUCCH resource 0 belongs, PUCCH group 0 is a PUCCH group with a low index, so the UE may update SR-RS 0, which is the first SR-RS. Likewise, the UE may update SR-RS 2, which is the first SR-RS of PUCCH resource 1.

EMBODIMENT 2-2

When one PUCCH group includes both STRP PUCCH resources and MTRP PUCCH resources, it is assumed that both spatial relation RSs of the MTRP PUCCH resources are updated.

At this time, the spatial relation RS of the STRP PUCCH resource included in the same PUCCH group may be ambiguous as to which RS of the two updated spatial relation RSs of the MTRP PUCCH resource should be updated.

To this end, the base station may indicate/configure to the UE which spatial relation RS to update among the two updated spatial relation RSs of the MTRP PUCCH resource through signaling such as an RRC message/MAC CE. Here, the signaling may be configured/defined for each PUCCH group.

Additionally or alternatively, it may be defined/configured/determined to be updated with the first (or second) spatial relation RS among the two updated spatial relation RSs of the MTRP PUCCH resource.

Additionally or alternatively, according to the index of the PUCCH group to be currently updated among the two PUCCH groups to which the MTRP PUCCH resource belongs, the spatial relation RS to be applied to the update of the STRP PUCCH resource among the two updated spatial relation RSs of the MTRP PUCCH resource may be determined.

Specifically, the spatial relation RS of the STRP of the group with a low index (i.e., low index group) among the two PUCCH groups to which the MTRP PUCCH resource belongs may be updated to the first RS of the two updated spatial relation RSs. And, the first spatial relation RS of other MTRP PUCCH resources included in the low index group may be updated.

In addition, the spatial relation RS of the STRP of the group with a high index (i.e., the high index group) among the two PUCCH groups to which the MTRP PUCCH resource belongs may be updated to the second RS of the two updated spatial relation RSs. And, the first spatial relation RS of other MTRP PUCCH resources included in the high index group may be updated.

For example, in Embodiment 1, if both SR-RS 0 and 1 of PUCCH resource 0 are updated, both PUCCH groups 0 and 1 may be updated. At this time, of the two PUCCH groups to which PUCCH resource 0 belongs, PUCCH group 0 is a group with a low index. Therefore, the SR-RS of PUCCH resource 2, which is a STRP PUCCH resource included in PUCCH group 0, may be updated to SR-RS 0, and the first SR-RS of PUCCH resource 1, which is an MTRP PUCCH resource, may be updated to SR-RS 0.

And, PUCCH group 1 of the two PUCCH groups to which PUCCH resource 0 belongs is a group with a high index. Therefore, the SR-RS of PUCCH resource 3, which is a STRP PUCCH resource included in PUCCH group 1, may be updated to SR-RS 1, and the second SR-RS of PUCCH resource 1, which is an MTRP PUCCH resource, may be updated to SR-RS 1.

EMBODIMENT 3

If the base station updates the STRP PUCCH resource to a PUCCH resource with two spatial relation RSs through MAC CE, the STRP PUCCH resource may be changed to an MTRP PUCCH resource.

However, the PUCCH group for the STRP PUCCH resource is configured with an RRC message, so even if it is changed to an MTRP PUCCH resource, it still belongs to one PUCCH group. Even if it is changed from a STRP PUCCH resource to an MTRP PUCCH resource, the PUCCH resource may still belong to one PUCCH group.

The operations according to Embodiment 1 and Embodiment 2 are performed on the premise that the MTRP PUCCH belongs to two PUCCH groups. Therefore, even if the STRP PUCCH resource is changed to the MTRP PUCCH resource, if the corresponding PUCCH resource belongs to one PUCCH group, the operations according to Examples 1 and 2 may not be performed.

Therefore, in order to more efficiently manage the update of the spatial relation RS of the PUCCH group, PUCCH group(s) for STRP PUCCH resources may be configured, and a group (e.g., one exclusive group) for MTRP PUCCH resources may be configured separately.

As an example, assume that the STRP PUCCH resource corresponding to TRP 1, the STRP PUCCH resource corresponding to TRP 2, and the MTRP PUCCH resource are configured for each of PUCCH groups 0, 1, and 2.

When the STRP PUCCH resource of PUCCH group 0 is updated to the MTRP PUCCH resource, the corresponding PUCCH resource may be changed from PUCCH group 0 to belonging to PUCCH group 2, which is the MTRP PUCCH group, without separate RRC signaling. And, the spatial relation RS established for other PUCCH resources of PUCCH group 2 may be updated to the updated spatial relation RS for the corresponding PUCCH resource.

As another example, when there are multiple MTPR PUCCH groups (e.g., 2), the base station may indicate which PUCCH group the changed MTRP PUCCH resource belongs to. As another example, the changed MTRP PUCCH resource may be changed to belong to a PUCCH group with the lowest (or highest) index among a plurality of MTRP PUCCH groups.

As another example, when the MTRP PUCCH resource is changed to STRP PUCCH with one spatial relation RS through MAC CE (or, when two spatial relation RSs configured for the MTRP PUCCH resource are configured to the same RS), the PUCCH resource belongs to the STRP PUCCH group, not the MTRP PUCCH group, and may be changed without RRC signaling.

At this time, if there are a plurality of STPR PUCCH groups (for example, two), the base station may indicate/set the PUCCH group to which the changed PUCCH resource belongs among the plurality of STRP PUCCH groups. As another example, the changed PUCCH resource may be changed to belong to a PUCCH group with the lowest (or highest) index among a plurality of STRP PUCCH groups.

EMBODIMENT 4

The MAC CE signal for updating spatial relation information for STRP PUCCH resources may include the corresponding PUCCH resource ID to be updated and the spatial relation information ID to be updated (i.e., spatial relation information ID to be newly activated for the corresponding PUCCH resource).

The MAC CE signal for updating the spatial relation information of the MTRP PUCCH may be defined/configured in two ways, which will be described later.

Firstly, MAC CE may include the ID of the PUCCH resource (to be indicated for update), the spatial relation information ID to be newly activated, and the spatial relation information to be updated among two spatial relation information (configured for MTRP PUCCH information) (i.e., among the two spatial relation information, spatial relation information to be replaced by the newly activated spatial relation information ID).

Second, the MAC CE may include the ID of the PUCCH resource (to be indicated for update) and the two spatial relation information IDs to be newly activated. Here, among the spatial relation information A and B configured for existing PUCCH resources, if A is updated to C and B is maintained, the base station may configure C and B as two spatial relation IDs to be newly activated through MAC CE. Accordingly, among the spatial relation information configured for PUCCH resources, A may be updated to C and B may be maintained.

EMBODIMENT 5

The above-described embodiments were described in terms of updating the spatial relation RS. However, the above-described embodiment may also be applied to the updater of PL RS. That is, an STRP PUCCH resource configured with one PL RS and an MTRP PUCCH resource configured with multiple (e.g., two) PL RSs may belong to the same PUCCH group. At this time, when updating the PL RS for MTRP PUCCH or/and STRP PUCCH resources belonging to the same PUCCH group, in the above-described embodiment, the PL RS for at least one PUCCH resource on the PUCCH group may be updated by replacing the spatial relation RS with the PL RS.

Figure 10:
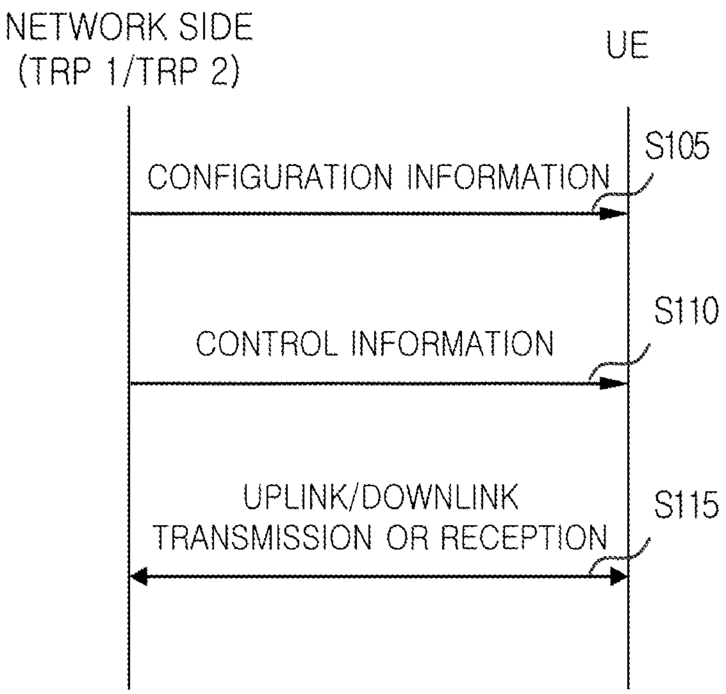
FIG. 10 is a diagram for describing the signaling procedure of the network side and the UE according to an embodiment of the present disclosure.

FIG. 10 is a diagram for describing the signaling procedure of the network side and the UE according to an embodiment of the present disclosure.

FIG. 10 shows an example of signaling between a network side and a terminal (UE) (e.g., Embodiment 1, Embodiment 2, Embodiment 3, Embodiment 4, Embodiment 5 or a combination of one or more of their specific Embodiments) in an M-TRP situation to which the examples of the present disclosure described above may be applied.

Here, the UE/network side is an example and may be replaced with various devices as described with reference to FIG. 11. FIG. 10 is for convenience of explanation and does not limit the scope of the present disclosure. Additionally, some step(s) shown in FIG. 10 may be omitted depending on the situation and/or settings. Additionally, in the operation of the network side/UE in FIG. 10, the above-described uplink transmission/reception operation, M-TRP-related operation, etc. may be referenced or used.

In the following description, the network side may be one base station including multiple TRPs, or may be one cell including multiple TRPs. Alternatively, the network side may include a plurality of remote radio heads (RRH)/remote radio units (RRU). For example, ideal/non-ideal backhaul may be set between TRP 1 and TRP 2, which constitute the network side. In addition, the following description is based on multiple TRPs, but it can be equally extended and applied to transmission through multiple panels/cells, and can also be extended and applied to transmission through multiple RRHs/RRUs, etc.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station(gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

The UE may receive configuration information from the network side through/using TRP1 and/or TRP2 (S105).

The configuration information may include information related to CORESET in which a plurality of TCI states are configured. The configuration information may include information related to network-side configuration (i.e., TRP configuration), resource allocation information related to transmission and reception based on M-TRP, and the like. The configuration information may be transmitted through higher layers (e.g., RRC, MAC CE). In addition, when the setting information is defined or configured in advance, the corresponding step may be omitted.

As another example, the configuration information may include information related to a plurality of PUCCH resources/PUCCH groups. For example, the configuration information may include information related to the number of PUCCH resources constituting a PUCCH group or/and the number of PUCCH groups. Here, one PUCCH group may correspond to one TRP.

Additionally, the configuration information may include spatial relation information configured for PUCCH resources. At this time, one spatial relation information may be configured for the PUCCH resource, but this is not limited and a plurality of spatial relation information may be configured.

For example, an operation in which the UE (100 or 200 of FIG. 11) receives the configuration information from the network side (200 or 100 of FIG. 11) in step S105 may be implemented by the device of FIG. 11 to be described below. For example, referring to FIG. 11, one or more processors 102 may control one or more transceivers 106 and/or one or more memories 104 to receive the configuration information, and one or more transceivers 106 may receive the configuration information from a network side.

The UE may receive control information from the network (S110). For example, the UE may receive a DCI scheduling uplink/downlink from the network side. As another example, the UE may receive a MAC CE for updating spatial relation information set for PUCCH resources from the network side.

As an example, MAC CE may include spatial relation information to be updated (i.e., spatial relation information to be replaced with a newly activated spatial relation information ID among a plurality of spatial relation information) among ID of the PUCCH resource to be updated, spatial relation information ID to be newly activated, and a plurality of spatial relation information configured for the PUCCH resource.

As another example, MAC CE may include the ID of a PUCCH resource to be updated and two spatial relation information IDs to be newly activated.

Additionally, if the control information is defined or configured in advance, the corresponding step may be omitted.

For example, the operation of the UE (100 or 200 in FIG. 11) in step S110 described above receiving the control information from the network side (200 or 100 in FIG. 11) can be implemented by the device in FIG. 11, which will be described below. For example, referring to FIG. 11, one or more processors 102 may control one or more transceivers 106 and/or one or more memories 104 to receive the control information, and one or more transceivers 106 may receive the control information from a network side.

The UE may transmit uplink or receive downlink to the network (S115).

As an example, the UE may transmit and receive uplink/downlink scheduled by DCI received from the network side. As another example, the UE may transmit the PUCCH to the network side using spatial relation information updated by the MAC CE received from the network side.

As an example, assume that two spatial relation information are configured in PUCCH resource 0. The UE may transmit PUCCH to TRP 1 using PUCCH resource 0 through one of two spatial relation information in TO 1. And, the UE may transmit PUCCH to TRP 2 using PUCCH resource 0 through the remainder of the two spatial relation information in TO 2. This is only an example, and the UE may transmit the PUCCH to the network based on the configuration information and DCI received from the network.

The UE may perform uplink transmission or downlink reception based on the Embodiments of the present disclosure (For example, Embodiment 1, Embodiment 2, Embodiment 3, Embodiment 4, Embodiment 5 or a combination of one or more of the detailed Embodiments thereof).

For example, the operation of the UE (100 or 200 in FIG. 11) in step S115 described above transmitting uplink to the network side (200 or 100 in FIG. 11) or receiving downlink from the network side (200 or 100 in FIG. 11) may be implemented by the device of FIG. 11, which will be described below.

Figure 11:
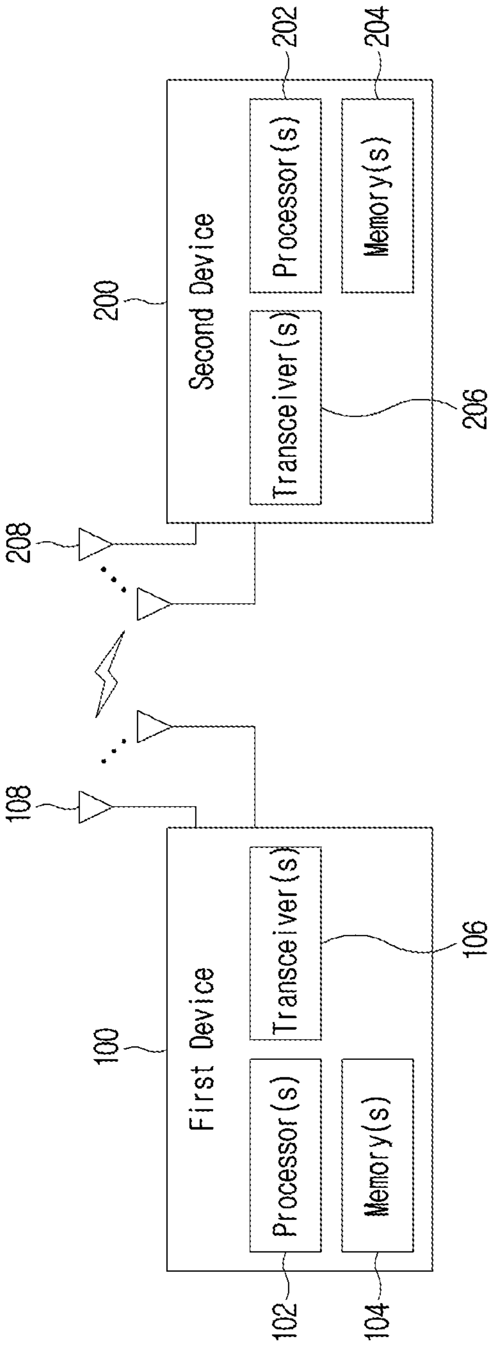
FIG. 11 illustrates a block diagram of a wireless communication device according to an embodiment of the present disclosure.

For example, referring to FIG. 11, one or more processors 102 may control one or more transceivers 106 and/or one or more memories 104, etc. to transmit uplink or receive downlink, and one or more transceivers 106 may transmit uplink or receive downlink to the network side.

General Device to Which the Present Disclosure may be Applied

FIG. 11 is a diagram which illustrates a block diagram of a wireless communication system according to an embodiment of the present disclosure.

In reference to FIG. 11, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure.

One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure. One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IOT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A. 5G system. but may be applied to various wireless communication systems other than the 3GPP LTE/LTE-A. 5G system.

The invention claimed is:

1. A method comprising:

receiving, by a user equipment (UE) from a base station, configuration information including information related to a plurality of physical uplink control channel (PUCCH) groups; and receiving, by the UE from the base station, first control information related to an update on at least one of a plurality of spatial relation reference signals (SR RSs) configured for a first PUCCH resource included in a first PUCCH group and a second PUCCH group among the plurality of PUCCH groups, wherein, based on an index value of each of the first PUCCH group and the second PUCCH group and the first control information, at least one SR RS configured for a plurality of PUCCH resources included in the first PUCCH group or the second PUCCH group is updated, wherein, based on an update of a first SR RS among a plurality of SR RSs configured for the first PUCCH resource being indicated by the first control information, at least one SR RS configured for a plurality of PUCCH resources included in the first PUCCH group is updated, wherein an index value of the first PUCCH group is lower than an index value of the second PUCCH group, wherein a plurality of SR RSs are configured for a second PUCCH resource among a plurality of PUCCH resources included in the first PUCCH group, and wherein a first SR RS among a plurality of SR RSs configured for the second PUCCH resource and the first SR RS among a plurality of SR RSs configured for the first PUCCH resource are updated to a same RS.

2. The method of claim 1, wherein:

based on an update of a second SR RS among the plurality of SR RSs configured for the first PUCCH resource being indicated by the first control information, at least one SR RS configured for a PUCCH resource included in the second PUCCH group is updated.

3. The method of claim 2, wherein:

a plurality of SR RSs are configured for a third PUCCH resource among a plurality of PUCCH resources included in the second PUCCH group, and a second SR RS among a plurality of SR RSs configured for the third PUCCH resource and the second SR RS among the plurality of SR RSs configured for the first PUCCH resource are updated to same RS.

4. The method of claim 1, wherein:

based on second control information indicating an update of a single SR RS configured for a fourth PUCCH resource among a plurality of PUCCH resources included in the first PUCCH group being received from the base station, the first SR RS among the plurality of SR RSs configured for the first PUCCH resource is updated.

5. The method of claim 1, wherein:

based on third control information indicating an update of a single SR RS configured for a fifth PUCCH resource among a plurality of PUCCH resources included in the second PUCCH group being received from the base station, the second SR RS among the plurality of SR RSs configured for the first PUCCH resource is updated.

6. The method of claim 1, wherein:

the first PUCCH group includes a fourth PUCCH resource on which a single SR RS is configured, the second PUCCH group includes a fifth PUCCH resource on which a single SR RS is configured, and based on an update of the plurality of SR RSs configured for the first PUCCH resource being indicated by the first control information:

a single SR RS configured for the fourth PUCCH resource and the first SR RS among the plurality of SR RSs configured for the first PUCCH resource are updated to a same RS, and a single SR RS configured for the fifth PUCCH resource and a second SR RS among the plurality of SR RSs configured for the first PUCCH resource are updated to a same RS.

7. The method of claim 1, wherein:

at least one of the first PUCCH group or the second PUCCH group includes a PUCCH resource on which a single SR RS is configured, and based on an update of the plurality of SR RSs configured for the first PUCCH resource being indicated by the first control information, information on a SR RS to be applied to update of the single SR RS among the plurality of SR RSs configured for the first PUCCH resource is received from the base station.

8. The method of claim 1, wherein:

the first control information includes at least one of identification information of the first PUCCH resource, identification information of an SR RS to be updated among the plurality of SR RSs configured for the first PUCCH resource, or identification information of at least one SR RS to be newly configured for the first PUCCH resource.

9. The method of claim 1, wherein:

the first control information is received from the base station through a medium access control (MAC) control element (CE).

10. A user equipment (UE) comprising:

at least one transceiver; and at least one processor coupled to the at least one transceiver, wherein the at least one processor is configured to:

receive, from a base station through the at least one transceiver, configuration information including information related to a plurality of physical uplink control channel (PUCCH) groups; and receive, from the base station through the at least one transceiver, first control information related to an update on at least one of a plurality of spatial relation reference signals (SR RSs) configured for a first PUCCH resource included in a first PUCCH group and a second PUCCH group among the plurality of PUCCH groups, wherein, based on an index value of each of the first PUCCH group and the second PUCCH group and the first control information, at least one SR RS configured for a plurality of PUCCH resources included in the first PUCCH group or the second PUCCH group is updated, wherein, based on an update of a first SR RS among a plurality of SR RSs configured for the first PUCCH resource being indicated by the first control information, at least one SR RS configured for a plurality of PUCCH resources included in the first PUCCH group is updated, wherein an index value of the first PUCCH group is lower than an index value of the second PUCCH group, wherein a plurality of SR RSs are configured for a second PUCCH resource among a plurality of PUCCH resources included in the first PUCCH group, and wherein a first SR RS among a plurality of SR RSs configured for the second PUCCH resource and the first SR RS among a plurality of SR RSs configured for the first PUCCH resource are updated to a same RS.

11. A base station comprising:

at least one transceiver; and at least one processor coupled to the at least one transceiver, wherein the at least one processor is configured to:

transmit, to a user equipment (UE) through the at least one transceiver, configuration information including information related to a plurality of physical uplink control channel (PUCCH) groups; and transmit, to the UE through the at least one transceiver, first control information related to an update on at least one of a plurality of spatial relation reference signals (SR RSs) configured for a first PUCCH resource included in a first PUCCH group and a second PUCCH group among the plurality of PUCCH groups, wherein, based on an index value of each of the first PUCCH group and the second PUCCH group and the first control information, at least one of SR RS configured for a plurality of PUCCH resources included in the first PUCCH group or the second PUCCH group is updated, wherein, based on an update of a first SR RS among a plurality of SR RSs configured for the first PUCCH resource being indicated by the first control information, at least one SR RS configured for a plurality of PUCCH resources included in the first PUCCH group is updated, wherein an index value of the first PUCCH group is lower than an index value of the second PUCCH group, wherein a plurality of SR RSs are configured for a second PUCCH resource among a plurality of PUCCH resources included in the first PUCCH group, and wherein a first SR RS among a plurality of SR RSs configured for the second PUCCH resource and the first SR RS among a plurality of SR RSs configured for the first PUCCH resource are updated to a same RS.

* * * * *